June 18, 1957 W. M. MILLER 2,795,916
LAWN EDGER WITH ADJUSTABLE LENGTH CUTTING BLADE
Filed Dec. 17, 1954 2 Sheets-Sheet 1

INVENTOR.
William M. Miller
BY
Albert J. Fihe
ATTORNEY

June 18, 1957    W. M. MILLER    2,795,916
LAWN EDGER WITH ADJUSTABLE LENGTH CUTTING BLADE
Filed Dec. 17, 1954    2 Sheets-Sheet 2
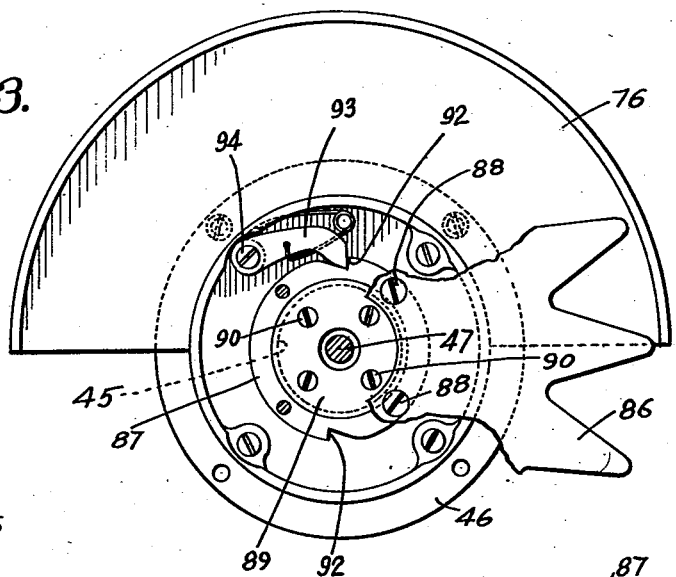
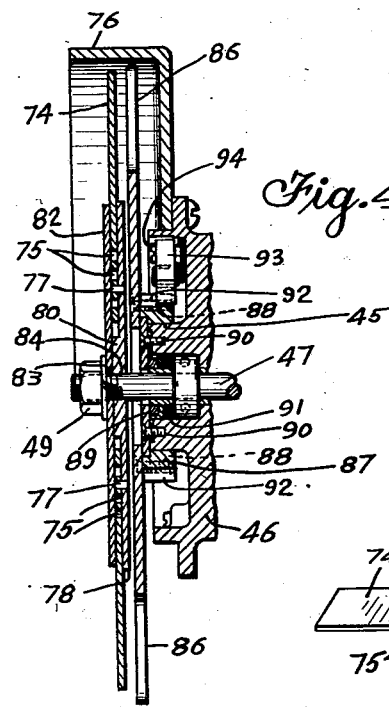
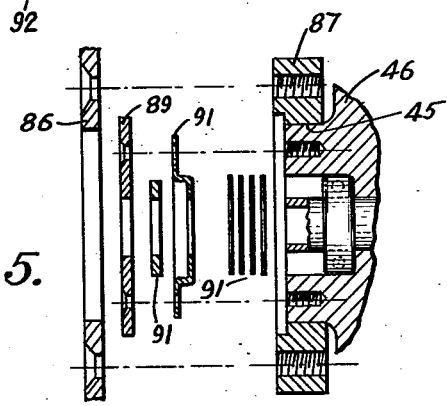
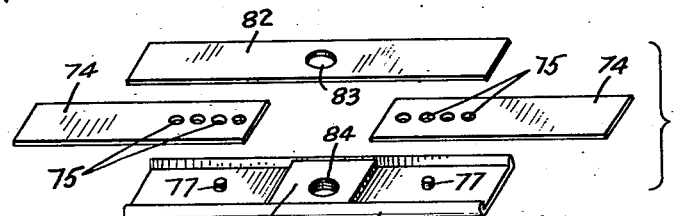
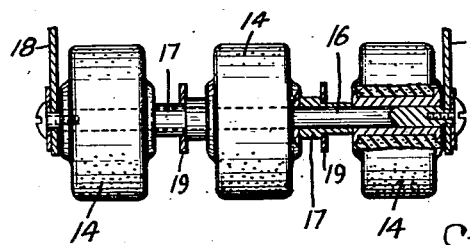
INVENTOR.
William M. Miller
BY
Attorney

United States Patent Office 2,795,916
Patented June 18, 1957

2,795,916

LAWN EDGER WITH ADJUSTABLE LENGTH CUTTING BLADE

William M. Miller, North Hollywood, Calif., assignor to Lawn Barber Corporation, North Hollywood, Calif., a corporation of California Application December 17, 1954, Serial No. 475,877

9 Claims. (Cl. 56—25.4)

This invention relates to a safety lawn edger whereby lawns can be trimmed with less time expenditure and with pleasing results.

One of the important objects of this invention is to provide a power operated lawn edger having a rotatable blade which blade is adjustable as to length and parts of which are also readily replaceable.

Another object of the invention is the provision of a power operated lawn edger which includes a positive safeguard for preventing the rotatable blade from striking hard surfaces or objects such as the edge of a sidewalk or stones or bricks which may be adjacent to the edge of the lawn to be trimmed.

Still another object of the invention is to provide a rotatable blade guard which is movable in one direction only, thereby assuring against damage to the blade which might otherwise occur.

Still another important object of the invention is the provision of a novel clutch arrangement for the rotatable blade whereby in the event of its accidentally striking some hard or substantially immovable object, no damage will result either to the motor or to the blade.

Other and further important objects of the invention will be apparent from the disclosures in the accompanying drawings and following specification.

The invention, in a preferred form, is illustrated in the drawings and hereinafter more fully described.

In the drawings:

Figure 3 is an enlarged detail view showing a portion of the safety wheel which prevents damage to the blade and this comprises a partial section taken on the line 3—3 of Figure 2 looking in the direction indicated by the arrows.

Figure 4 is an enlarged section taken on the line 4—4 of Figure 2 looking in the direction indicated.

Figure 5 is an exploded view showing the relationship between the driving shaft, the rotatable blade and the protective wheel or disc.

Figure 6 is an enlarged exploded view illustrating the components of the adjustable blade.

Figure 8 is an enlarged partial sectional view of the axle and wheel construction.

As shown in the drawings:

Figure 1:
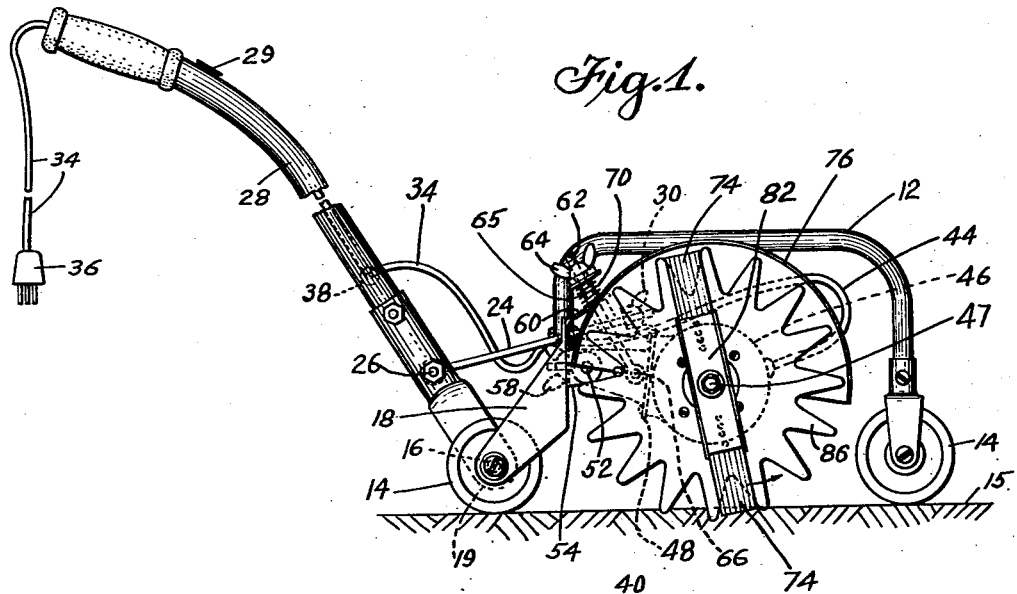
Figure 1 is a side elevation of the improved safety lawn edger of this invention illustrating the important novel details.

The reference numeral 12 indicates generally the main frame of the improved safety lawn edger of this invention, having wheels 14 by which it is propelled, these wheels being mounted on axles 16.

Figure 2:
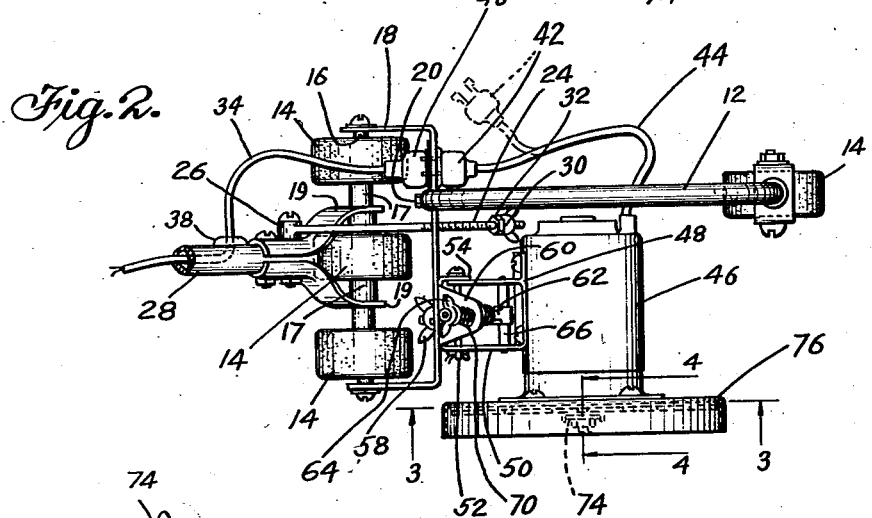
Figure 2 is a top plan view of the edger illustrating other features.

A frame 18 shaped as best shown in Figure 2 supports the three rear wheels 14 and their axle or shaft 16. The body portion 12 is preferably tubular and is connected to the frame 18 by a bolt 20.

The frame or plate 18 has an opening therein through which a threaded bolt 24 passes, the same having one end pivoted at 26 to a handle 28, and an adjustable winged nut 30 is mounted on the outer end of the threaded pivoted shaft 24. An adjusting nut 32 is on the shaft 24 in conjunction with the winged nut 30.

A current-carrying wire 34 is led through the handle 28, which is hollow, and the wire 34 terminates in a plug 36 for connection to a suitable source of current or power. A control switch 29 is located in the handle. Obviously, a source of power other than electricity can be employed. A grommet 38 is provided for leading the wire 34 out through a suitable opening in the handle 28 and the wire then terminates in a fixture 40 fastened to the plate or bracket 18, which fixture is adapted to removably receive a plug 42 carrying a further length of wire 44 to a motor 46. This permits ready removal of the motor and cutter from the roller supported frame whenever a hand operation is desired, as for example in hedge trimming. The motor is mounted on an auxiliary frame or bracket 48 having integral arms 50. A shaft 52 is fitted into aligned openings in the two bracket elements 50 and a secondary bracket 54 is pivotally mounted on the shaft 52, which bracket is supported on the plate 18 by means of a winged nut 58.

An integral extension 60 of the bracket 54 has an opening therein through which a bolt 62 passes, the same having a winged nut 64 thereon operating against a spring 70, which spring surrounds a sleeve 65. The bolt 62 is pivotally mounted on a cross shaft 66 fitted in the bracket 50.

The winged nut 58 permits angular adjustment of the motor and its cutting blade.

A cutting blade composed of two removable and adjustable end pieces 74 is mounted on the shaft of the motor 46 and a guard 76 is provided for the blade.

As best shown in Figure 6, the two removable and replaceable portions 74 of the cutting blade are clamped between a channel-like member 78 which has a reinforcement or stop 80 therein adjacent its middle and a correspondingly shaped plate 82 having an opening 83 therein which aligns with an opening 84 in the blade clamp 78 when the elements are assembled on the shaft 47 of the motor. The end of the shaft 47 is screw-threaded and so is the opening 84. A nut 49 is fitted on to the end of the shaft to hold the parts in place.

Each of the blade elements 74 has a series of openings 75 therein adapted to selectively fit over pins 77 mounted in the channel 78. In this manner, the effective length of the blade can be altered and adjustments can be made for wear which inevitably occurs.

Figure 7:
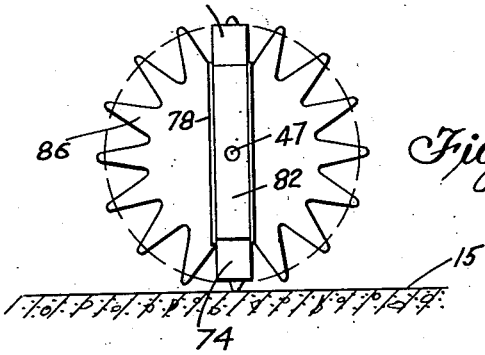
Figure 7 is an elevation showing the relationship between the blade and its protective star wheel.

In order to protect the blade from striking against adjacent sidewalks, bricks or the like when rotating, a guard in the shape of a toothed disc or what might be called a "star wheel" is provided. This is best illustrated at 86 in Figures 1, 3 and 7, and as shown in Figure 7, its effective periphery is usually slightly greater than the effective periphery of the composite blade 74. This star wheel is mounted for rotatable movement adjacent the blade and in the guard 76 so that when the cutter or edger is moved along a sidewalk or the edge of same, it will ride on any hard surface, as shown in Figure 7, and protect the ends of the blade 74 from undesirable contact therewith. Obviously when the star wheel is riding adjacent the edge of the sidewalk 15, as shown in Figure 1, the ends of same will penetrate the adjacent earth or grass and further protect the blade 74. The blade ends can be extended beyond the effective periphery of the guard wheel 86 in the event that a preliminary digging or cutting away of accumulated earth and grass adjacent the sidewalk is desired. Otherwise the blade is normally operated inside the effective periphery of the guard wheel or blade 86.

The guard or star wheel 86 is mounted for a one way rotation on the casing or frame of the motor 46 by means of a ring or annulus 87, as best shown in Figures 3 and 5. This annulus is rotatably mounted on an extension 45 of the motor frame 46 which is shaped to receive the annulus. Machine screws or bolts 88 connect the star wheel to the annulus which is held in place on the end 45 of the motor frame 46 by a plate 89 fastened in position by machine screws or bolts 90. Oil seal elements 91 surround the motor shaft 47 behind the plate 89.

The annulus 87 is notched in two places as shown at 92 in Figure 3 and a spring pressed pawl 93 is pivotally mounted on the motor frame 46 at 94 to assure of a clock-wise rotation only of the guard plate 86, as viewed in Figure 3.

The single shaft 16 which supports the rear wheels 14 has a series of spacer sleeves 17 mounted thereon which position the wheels and also position the bifurcated ends 19 of the handle structure 28. This provides a strong yet simple and easily assembled construction.

It will be evident that one of the great disadvantages of present day lawn edgers is hereby eliminated. The rotating blade is fully protected at all times against undue wear and also against accidental contact with hard objects or surfaces, which inevitably lessen its useful life. The apparatus can be readily moved at a relatively high rate of speed along the edge of a sidewalk and the adjacent lawn will be properly, efficiently and beautifully trimmed in a remarkable short space of time. There will be no danger to the apparatus or to the operator and the effective life of the device as a whole will be greatly increased.

I am aware that many changes may be made and numerous details of construction varied throughout a wide range without departing from the principles of this invention, and I therefore do not propose limiting the patent granted hereon otherwise than as necessitated by the prior art.

I claim as my invention:

1. A lawn edger comprising in combination, a wheeled supporting framework, an operating handle pivotally mounted on the framework, a motor mounted in the framework, a cutting blade on the motor shaft, a star-shaped rotatable guard wheel on the motor frame adjacent the blade, said blade being adjustable as to effective length.

2. A device as described in claim 1, wherein the effective periphery of the guard blade is normally slightly greater than the orbit of revolution of the blade.

3. A device as described in claim 1, wherein the guard blade is rotatable in one direction only.

4. A device as described in claim 1, wherein said adjustable structure comprises a pair of blade elements and a fixture for adjustably receiving the same.

5. A device as described in claim 4, wherein each of the blade elements has a plurality of aligned openings therein and wherein the fixture has a pair of pins adapted to selectively fit into two of said openings.

6. A device as described in claim 5, wherein the fixture includes a channelled element screw-threadedly mounted on the motor shaft and supporting the pins, and a juxtaposed plate adapted to be pulled against the blade elements.

7. A device as described in claim 6, wherein the mounting for the blade includes a nut on the screw-threaded end of the shaft and a bushing surrounding the shaft.

8. A device as described in claim 3, wherein the guard blade is mounted on an annulus, said annulus being rotatably mounted on an extension of the motor frame and a plate on the motor frame for retaining said annulus in position.

9. A device as described in claim 8, wherein notches are formed in the annulus and a pawl is mounted on the motor frame to provide a one-way rotation only of the annulus and guard blade.

References Cited in the file of this patent

UNITED STATES PATENTS

| | | |
|---|---|---|
| 2,251,033 | Bell | Sept. 5, 1950 |
| 2,525,944 | Ralston | Oct. 17, 1950 |